Feb. 27, 1968 YOSHIO TSUNODA ET AL 3,371,028
ELECTRODIALYSIS APPARATUS HAVING STRAIGHT ANGLED SOLUTION PATHS
Filed Aug. 20, 1965 4 Sheets-Sheet 1
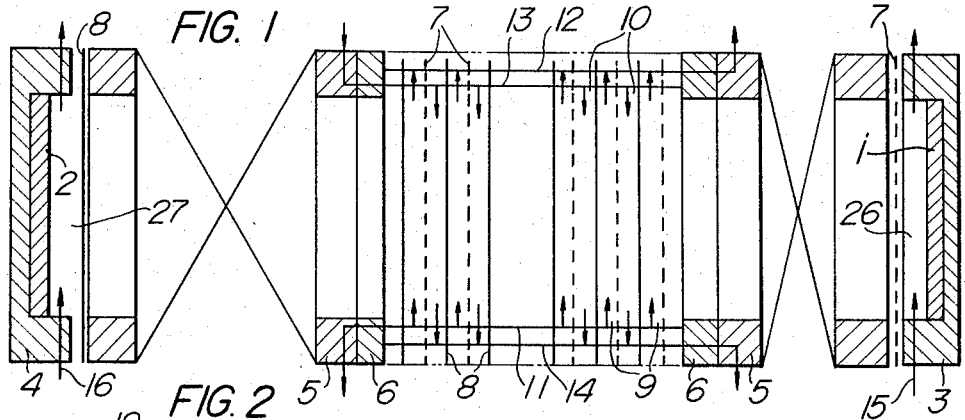
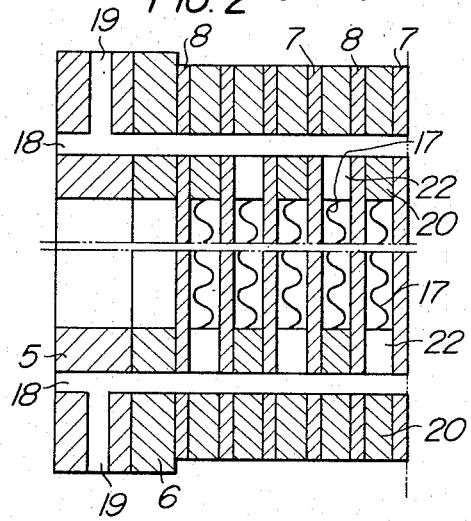
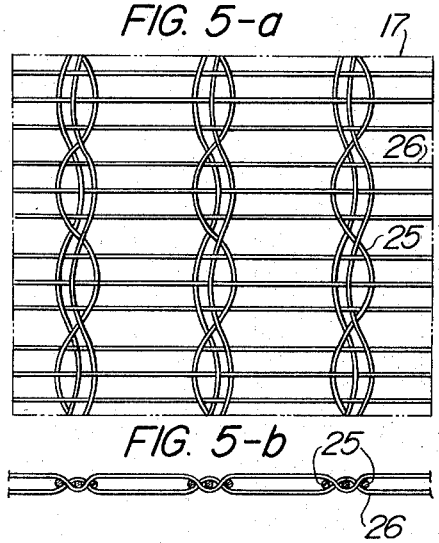
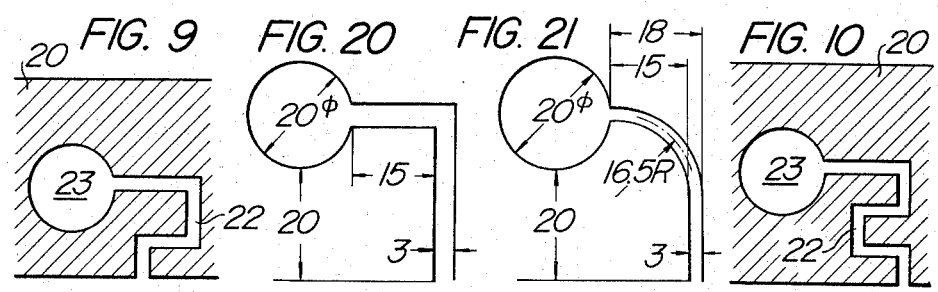
Yoshio Tsunoda,
Maomi Seko,
Kazuyuki Fuzita,
Tetuya Miyake
INVENTORS
BY Wenderoth, Lind and Ponack
ATTORNEYS

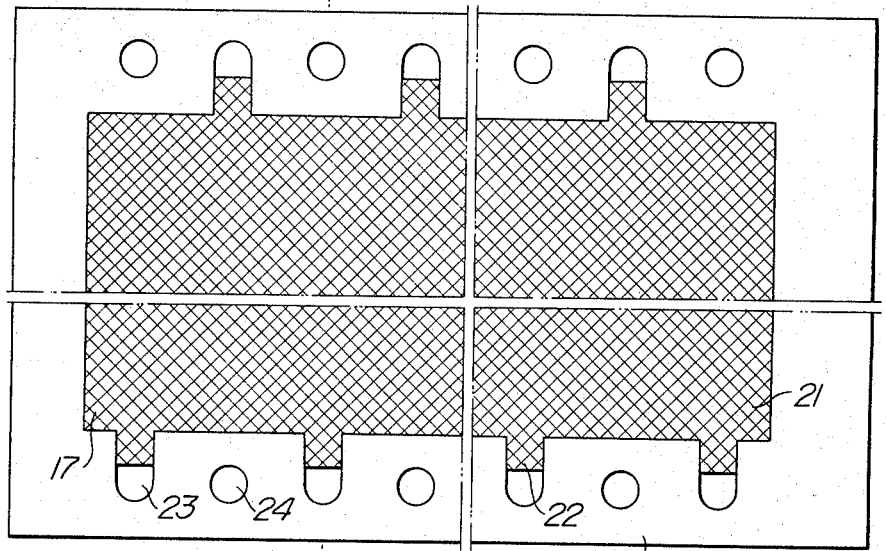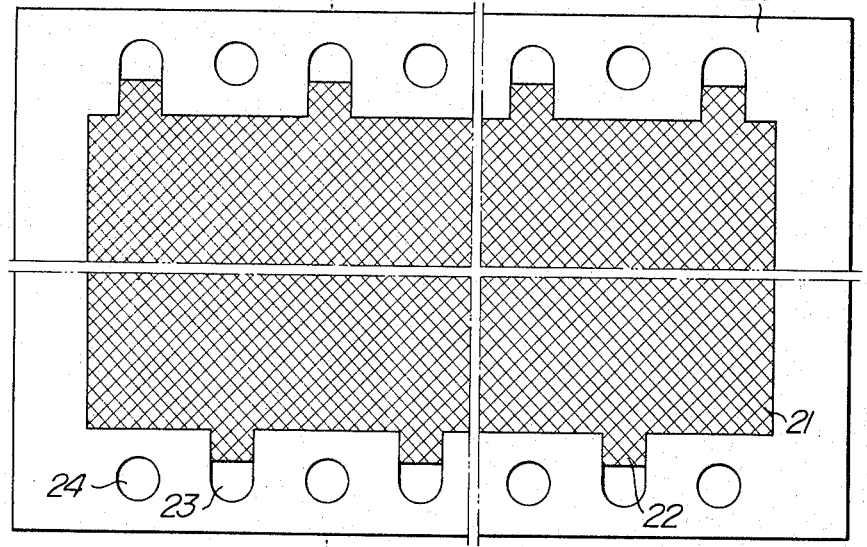

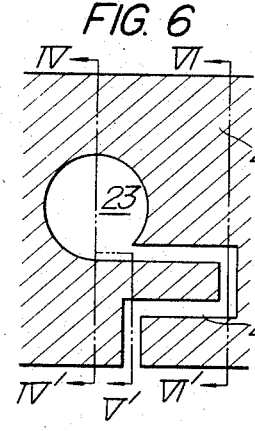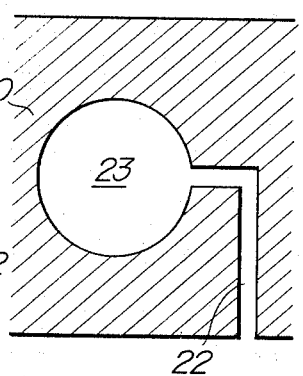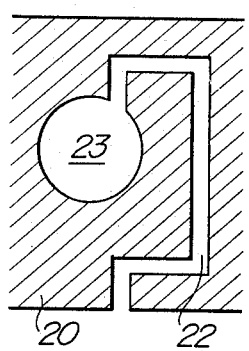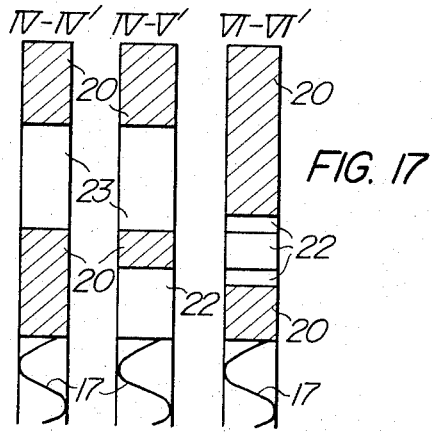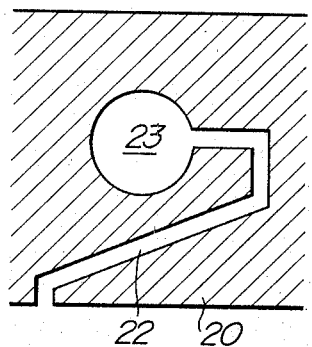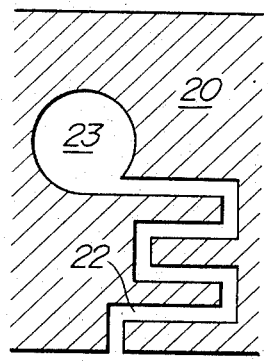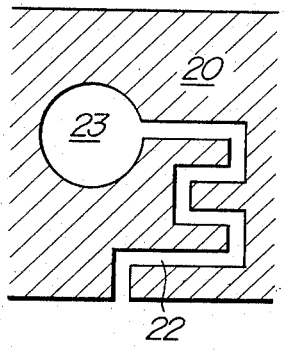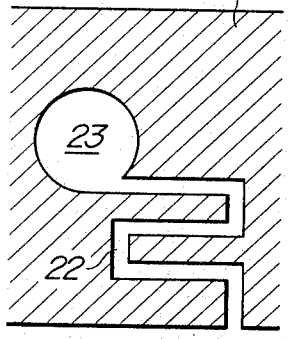

United States Patent Office 3,371,028
Patented Feb. 27, 1968

3,371,028
ELECTRODIALYSIS APPARATUS HAVING STRAIGHT ANGLED SOLUTION PATHS
Yoshio Tsunoda and Maomi Seko, Tokyo, Kazuyuki Fuzita, Yokohama-shi, and Tetuya Miyake, Tokyo, Japan, assignors to Asahi Kasei Kogyo Kabushiki Kaisha, Kita-ku, Osaka, Japan
Continuation-in-part of application Ser. No. 55,379, Sept. 12, 1960. This application Aug. 20, 1965, Ser. No. 481,293
Claims priority, application Japan, Aug. 25, 1960, 35/35,745
2 Claims. (Cl. 204—301)

This application is a continuation-in-part of our application Serial No. 55,379 filed on September 12, 1960, now abandoned.

This invention relates to electrodialysis apparatus and more particularly multi-cell apparatus comprising a plurality of anion-permeable membranes, cation-permeable membranes and frames.

In attempting to desalt or concentrate an electrolyte solution or separation of more than two materials, an electrodialysis apparatus which includes selectively anion-permeable resin membranes and selectively cation-permeable resin membranes alternately placed so as to have concentrating chambers and diluting chambers in alternate alignment is heretofore known. In general, however, the previously known apparatus requires high skill and considerable time to assemble or dismantle a stack because of the complexity of its construction. In this known apparatus, a stack is constructed by assembling ion exchange resin membranes having holes therethrough forming ducts for the solution, square-shaped elastic frames which are located between the membranes and which support the rim of the membranes outside the said holes and spacing members and rigid plates arranged around the holes in order to define flow paths for the solution from the conduits. As described in U.S. Patents 2,881,124, 2,758,083 and 2,735,812. In such apparatus considerable effort and skill are required in assembling or dismantling the apparatus, because there are so many different kinds of parts required to form the frame and to define the flow paths for the solution. As to the reason why such a construction should be employed, it is alleged that a sufficient small distance between membranes cannot be maintained by utilizing frames having holes for the said conduits.

It is an object of this invention to provide an improved apparatus with small intermembrane distance.

It is another object of this invention to provide an improved solution path which prevent the leakage between diluting chambers and concentration chambers during the electrodialysis process.

According to this invention, there is provided a multi-cell electrodialysis apparatus comprising a plurality of alternate anion-permeable membranes stacked with the interposition, therebetween, of frames, each of which defines an electrodialysis area or chamber surrounded by the periphery of the frame, diluting and concentrating chambers alternating through the stack, holes being positioned in the periphery of both the membranes and frames to form supply and exhaust conduits for carrying each of a diluting and a concentrating solution through the stack and continuous solution paths being formed in each frame between the holes and the electrodialysis area so as to provide communication in a diluting chamber only between the electrodialysis area and the supply and exhaust conduits for the diluting solution and in a concentrating chamber only between the electrodialysis area and the supply and exhaust conduits for the concentrating solution, wherein at least one of said solution paths is formed by the cutting away or omission of part of the appropriate frame so that the path is narrow, has the same width all through and is sectioned into at least two straight paths, crossing of the paths being in the form of polygonal line. The solution paths, the angle of said crossing being (this crossing being referred to as sharp bend hereafter) equal 90° is most conveniently used. When the conventional solution paths are used, for example, a solution, paths being straight between the hole and the electrodialysis area, or solution paths formed by curved passage between the hole and the electrodialysis area, the portions of membrane which are in contact with the frame on its both sides will always bow into the solution path portions when the membranes, frames and other members are assembled together under pressure. The bowing of the membranes into the solution path portions forms an undesirable passage between membrane and another frame to cause the flowing of diluting solution into the adjacent concentrating chamber or concentrating solution into the adjacent diluting chamber. Thus, there occurs, namely, the intercellular leakage which causes the lowering of the desalting efficiency. In an attempt to eliminate such an undesirable leakage between concentrating chambers and diluting chambers, the inventors have found that the improved solution path which is characterized by the construction as mentioned above can completely prevent the bowing of the membrane and the subsequent leakage of the solution.

The more the crossings are and the narrower the solution path is, the more completely the leakage can be prevented.

The presence of at least one such sharp bend in the solution path, along with the straight construction between any two crossings is quite effective for preventing the bowing wrinkling of the membrane into the solution path portions.

Compressible porous spacers of a water resistant material and having an unstressed thickness not less than that of the frames may be located in one or more of the chambers so as not to extend into any of the solution paths.

Since each frame used in apparatus according to this invention is provided not only with holes for the conduits for supplying or discharging solution, but also has the solution-paths formed in the frame, a stack can easily be assembled by an unskilled person by piling up alternately frames and membranes with spacers interposed therebetween.

Furthermore, in the present invention, because a stack is assembled using only three kinds of parts, i.e., selectively permeable membranes, frames and spacers, small intermembrane distance is obtainable, and the uniform distribution of the solution in each chamber is obtained by supplying and discharging the solution through the conduits in the peripheral part of the membrane, thus preventing the polarization of the solution and deposition of scale during operation of the apparatus.

In order that this invention may more readily be understood, reference will now be made by way of example to the accompanying drawings, in which:

FIGURE 1 is a schematic sectional view of one embodiment of a multi-cell electrodialysis apparatus according to the present invention, the arrows indicating the direction of flow;

FIGURE 2 is a sectional side elevation taken along line I–I¹ in FIGURE 3 and the line II–II¹ in FIGURE 4 of a stack (which term is used herein to mean a plurality of alternate concentrating and diluting chambers formed by assembling selectively ion-permeable resin membranes, frames and spacers between holding frames);

FIGURES 3 and 4 are plan views of an example of the frames and spacers of the apparatus;

FIGURES 5a and 5b are respectively a plan view and side elevation of an example of a spacer made of a highly porous fabric;

FIGURES 6 to 16 are fragmentary plan views of frames illustrating the form of holes perforated through the peripheral parts of such frames so as to form conduits for supplying or discharging concentrating solution or diluting solution, and passageways through which one of the solutions is supplied to, or discharged from, the chamber (said passageway being referred to as solution-path hereinafter);

FIGURE 17 is a cross-sectional view taken along the line IV–IV$^1$, IV–V$^1$ or VI–VI$^1$ in FIGURE 6;

FIGURES 20 and 21 are diagrammatic views of solution paths according to the present invention and prior art respectively.

Figure 15:
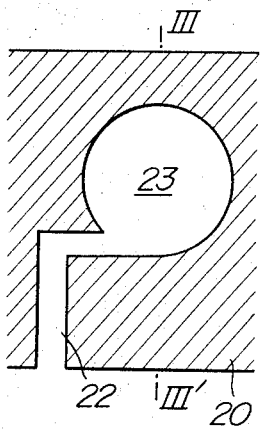
Figure 16:
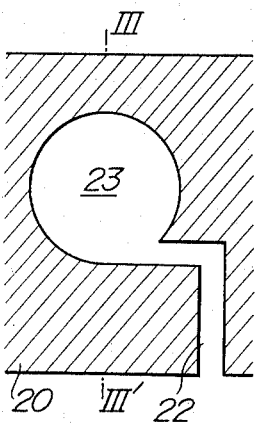

Referring to the drawings, in FIGURE 1, a cathode chamber 26 is composed of a cathode 1, a cathode frame 3 in which the cathode is accommodated, and a cation-selective permeable membrane 7 located in front of the cathode. In the same way, an anode chamber 27 is composed of an anode 2, an anode frame 4 in which the anode is accommodated, and an anion-selective permeable membrane located in front of an anode. The anode frame and cathode frame are made of, or coated with, electrically insulating materials. Between the anode and cathode chambers there exist one or more stacks fastened by two fastening frames 6 interposed between feeding frames 5. Arrows 15 and 16 respectively show the flow of liquid streams in the cathode chamber and the anode chamber to remove materials which are produced by the respective electrode reaction during dialysis, e.g. chlorine, hydrogen, sodium hydroxide, etc.

In FIGURE 1, one stack, as seen in the middle of FIGURE 1, comprises a plurality of alternate diluting chambers 9 and concentrating chambers 10 separated by alternate selectively cation-permeable resin membranes 7 and selectively anion-permeable resin membranes 8. In each of the diluting chambers 9, a solution to be diluted is supplied simultaneously, usually from the bottom portion of the chamber through one or more conduits interconnecting individual diluting chambers, and discharge of solution is taken usually from the top portion of the chamber through one or more conduits 12. Similarly, in each of the concentrating chambers 10, a solution to be concentrated is supplied usually from the top part of the chamber through one or more conduits 13 interconnecting the individual concentrating chambers and is discharged from the bottom of said chamber through one or more conduits 14 interconnecting the individual concentrating chambers.

FIGURES 3 and 4 show an example of a pair of frames of adjacent diluting and concentrating chambers. On the upper and lower peripheral parts of the selectively ion-permeable resin membranes 7 and 8, and the frames, at least four holes 23 and 24 are provided so as to constitute the conduits 11, 12, 13 and 14, FIGURE 1. The frame of FIGURE 3 (hereinafter referred to as frame A) and the frame of FIGURE 4 (hereinafter referred to as frame B) have the same number of holes at mutually corresponding positions. A passageway 22, shown in FIGURES 3 and 4 is provided by cutting away a part of the frame between each hole 23 and the concentrating or diluting chamber so as to be narrow compared with the diameter of hole 23, and have at least one sharp bend and is an example of solution-path which may be used in apparatus according to this invention. For convenience, these figures show the case when both the frames A and B have similarly shaped solution-paths.

Thus, while both the holes 23 and 24 are perforated, the hole 24 has no solution-path, whereas the hole 23 has the solution-path 22. On the frame B, the holes 24 and 23 are staggered with respect to those of the frame A, so that the holes 23 of frame A are in the positions corresponding with holes 24 in frame B and vice versa. Also on the selectively cation-permeable resin membrane 7 and the selectively anion-permeable resin membrane 8, holes with the same or approximately the same diameter as those of the frames are perforated at positions corresponding to those on the frames.

Between the two fastening frames 6, the selectively cation-permeable resin membrane 7, the selectively anion-permeable resin membrane 8, the frame A, the frame B and a spacer 17 are assembled in a predetermined sequence so as to form diluting chambers and concentrating chambers alternately and the whole tightly fastened by the fastening frames and assembled between two feeding frames 5 (only one frame being shown in FIGURE 2). All assemblies are fastened by a press at a suitable pressure depending on the material of the frame 20.

A hole 19 is provided perpendicular to the hole 18 as shown in FIGURE 2 and the solution supply and discharge of the concentrating solution and the diluting solution respectively to the stack is effected through the hole 19.

Since the solution paths are narrow, the membranes do not tend to bend into the solution paths and any such bending is precluded by the presence of sharp bends in the solution paths. Leakage, therefore, is not possible between adjacent chambers and thus the mixing of the concentrating and diluting solutions is prevented.

One stack may comprise a large number of pairs of membranes, and between the cathode and anode, one or more stacks may be interposed between the feeding frames. This modification of the present invention will be explained further in detail.

Firstly, the supply or discharge of the concentrating solution or diluting solution to the individual stacks placed between cathode 1 and anode 2 may be made, as seen in FIGURE 2, separately through the hole 19 by closing the end of the hole 18. Alternatively, when more than two stacks are jointly arranged, it is also possible to supply or discharge the solutions to the stacks from one common feeding frame through extended ducts formed by joining the hole 18 and closing the hole 19, so that the stacks form one big stack. In FIGURE 1, the dilution stream flows upwardly from the lower part of the chamber 9, and the concentration stream flows downwardly from the upper part of the concentrating chamber 10. Of course, several other methods of operation are possible including downward flow in the diluting chamber 9 and upward flow in the concentrating chamber, or upward or downward flow in both of the concentrating and diluting chambers. In FIGURE 1, the supply of the concentrating solution and the diluting solution is effected through the feeding frame at the anode side and the discharge of said solutions is effected through the feeding frame at the cathode side. It is also, however, possible to supply both of the concentrating and diluting solutions through the feeding frame at the cathode side and discharge said solutions through the feeding frame at the anode side, or to supply either of the two from the anode side and to discharge the other from the cathode side, while the other is supplied from the cathode side and discharged from the anode side.

The holes forming the conduits in the frames and membranes may be provided at any peripheral part of the frames, e.g. upper and lower portions or left and right portions but preferably they are provided at the upper and lower sides of the frames. Usually the holes which form the conduits for supplying or discharging the diluting solution and those which form the conduits for supplying or discharging the concentrating solution are disposed alternately at the peripheral part of the frame. The holes for supplying or discharging the diluting solution and those for supplying or discharging the concentrating solution may have equal or different diameters. Further, on the one side of the frame, the number of the diluting solution-supplying or -discharging holes may be the same as or different from that of the concentrating solution-supplying or -discharging holes.

The pitch between neighboring holes is preferably less than 30 cm. Further, a line which connects the centres of the individual holes for supplying or discharging the concentrating solution and that which connects the centres of the individual holes for supplying or discharging the diluting solution may be the same or different. The holes of the membranes are concentric with the holes at the corresponding positions of the frame and these holes may be the same or different in diameter.

The frames used in the present invention are made of an elastic material, e.g. natural rubber, synthetic rubber, polythenes, polystyrene resin, polyester resin, urea and melamine resin, polyvinyl chloride resin, polyacrylic resin, polyamide resin, polyurethane resin, etc., but, natural rubber and synthetic rubbers are preferred in view of the less permanent deformation by compression.

Several examples of forms of solution-path which may be used in the apparatus of this invention are shown in plan view in FIGURES 6 to 16, whilst FIGURE 17 shows the sectional views taken along the lines IV–IV$^1$, IV–V$^1$ or VI–VI$^1$ in FIGURE 6.

Because the solution-path shown in FIGURES 6 to 16 are narrow and have sharp bends, the ion-permeable membrane does not tend to bend at the solution-path and form apertures between the membrane and the frame, through which the solution from the conduits to the individual chamber could flow, and thus the leakage between two adjacent chambers can be effectively prevented.

It is preferable to employ a shape such that the solution-path in a frame does not register with the solution-path in the next frame when the frames are stacked. It is also preferable that, in any one frame, solution-paths are not arranged opposite one another.

In the solution-path of FIGURES 6 to 16, the width of the solution-path may be generally less than 5 mm., and the effective number of bends may be between one and seven. When there are more than two bends in the solution paths, they may be a combination of the bends having the same angle as shown in FIGS. 6, 8, 9, 10, 11, 12, 13 or a combination of said sharp bends each having different angle. When these requirements are satisfied, any suitable shape of solution-path may be employed between any point at the circumference of the hole 23 and the chamber 1.

The examples of solution-path illustrated may be used as solution-paths for either the concentrating of diluting chambers or both. In FIGURES 3 and 4, the frames A and B defining the diluting and concentrating chambers have the same type of solution-path, but these frames may have different types of solution-path.

When a solution-path of any of the forms shown in FIGURES 6 to 16 is used for one of the frames A and B, a solution-path of any of the shapes illustrated can be used for that of the other frame.

There are also some cases where, in one cell, two or more spacers may be used at one time in which event the direction of weaving described below may be different. Where two or more spacers are overlapped the total thickness of the overlapped spacers must not be smaller than that of the frame.

Each spacer has a thickness prior to being positioned in the apparatus at least slightly greater than the thickness of the frame and a thickness the same as the thickness of the frame when positioned in the apparatus.

The spacer may be present in the electrodialysis area regardless of the type of the solution-path used as it keeps inter-membrane distance constant in the electrodialysis area and makes the solution distribution even and avoids the local decrease of the concentration in an electrodialysis area and also gives rise to enough turbulent flow to disturb the streams within each of the chambers as much as possible.

In our co-pending U.S. application Ser. No. 379,559, now U.S. Patent No. 3,284,335 (continuation-in-part application of No. 55,433) there is described an apparatus similar to that of this invention and wherein the compressible spacer extends into one or more of the solution-paths. FIGURES 5a and 5b show an example of the spacer, FIGURE 5a being a section taken along the direction of the electric current and FIGURE 5b being a section taken along the direction of the liquid stream perpendicular to the former direction. Warp yarns of filaments 25 and weft yarns of filaments 26 are so woven as to provide sufficient space for flow of liquid through the spacer, while the warp yarns of filaments are twisted together to provide sufficient thickness to the spacer. Preferably the spacer is woven from monofilaments. Chemical-resistant hard fibres e.g. fibres of the material sold under the Registered Trademark "Saran" or polyvinyl chloride fibres or other organic or inorganic high molecular polymer fibres are conveniently used.

Figure 18:
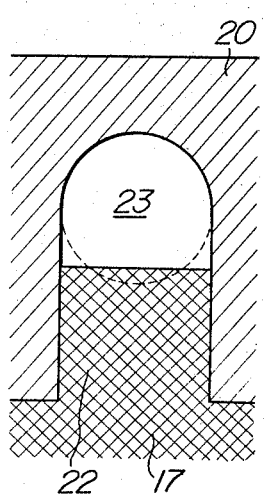
FIGURES 18 and 19 are respectively, an enlarged sectional view and an elevation view of a frame showing a spacer extending into a solution path.
Figure 19:
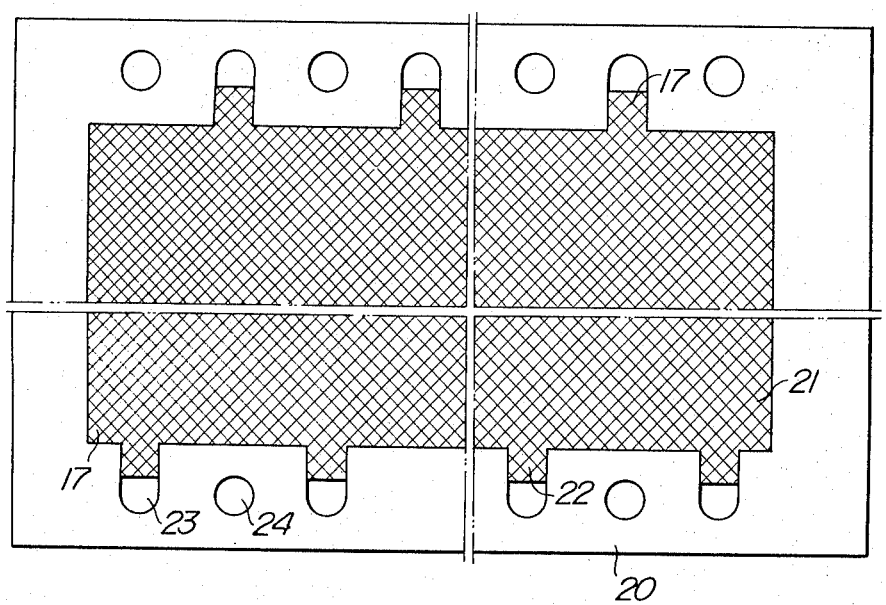

When there is a relatively greater difference between the flow rates of the solutions supplied into or discharged from the concentrating chambers and the diluting chambers, it is advantageous to employ a combination of the kinds of frames which have different forms of solution-path. Usually the frames having the solution-paths of FIGURES 6 to 16 with a narrow width and more than one bend are used for feeding and discharging the solution of smaller flow rate (generally the solution of the concentrating chamber), while the frames having the solution-paths of FIGURES 18 and 19 are used for the solution of greater flow rate (generally the solution of the diluting chamber).

The following is an example of the concentration of sea water which was carried out using an electrodialysis apparatus according to this invention.

*Example 1*

250 selectively cation-permeable resin membranes 7, having an electrodialysis area of 100 dm.$^2$, and 250 selectively anion-permeable resin membranes 8, 249 frames A of the form shown in FIGURE 3, 250 frames B of the form shown in FIGURE 4 and 499 spacers 17 cut into shape so as to fit the electrodialysis area and represented by the cross-hatched line portion in FIGURES 3 and 4 were assembled into a stack comprising 249 concentrating and 250 diluting chambers at inter-membrane spacings of 0.75 mm. This stack was inserted between two feeding frames 5 and then placed between a cathode and an anode. The diluting stream which was sea water (Cl$^-$: 0.535 N, SO$_4^{--}$: 0.054 N, Ca$^{++}$: 0.020 N, Mg$^{++}$: 0.106 N, K$^+$: 0.0095 N, Na$^+$: 0.4535 N) flowed at the flow rate of 180 l. per min. per 250 chambers upwardly from the lower part of the dialysis apparatus to the diluting chambers, while the concentrating solution which was concentrated sea water having a chlorine concentration of 3.90 N was passed at the flow rate of 25 l. per min. per 249 chambers. Simultaneously, direct electric current of 350 amp. was passed. Desalted water having a chloride concentration of 0.27 N was collected from the upper part of the dilution chambers and discharged through the conduit 12. From the concentrating chamber 10, a concentrated solution having a chloride concentration of 3.90 N was recovered at the rate of 37 l. per min. through the conduit 14. Thus at an electric efficiency of 86%, 720 l. of a 3.90 N concentrated liquid were produced per hour. No trouble was experienced during the continuous operation of such apparatus with this process over a period of three months.

Another example of use of apparatus according to the present invention is the desalting of saline water of 2000 p.p.m. (Ca$^{++}$: 27 p.p.m., Mg$^{++}$: 83 p.p.m., Na$^+$: 611 p.p.m., SO$_4^{--}$: 150 p.p.m., Cl$^-$: 1130 p.p.m.) to produce drinking water of 405 p.p.m. (Ca$^{++}$: 5 p.p.m., Mg$^{++}$: 14 p.p.m., Na$^+$: 129 p.p.m., SO$_4^{--}$: 34 p.p.m., Cl$^-$: 223 p.p.m.).

The apparatus used in this example comprised two stages, each including a stack of membranes having an electrodialysis area of 100 dm.² Into the diluting chambers 9 of the stack of the first stage consisting of 200 pairs of membranes, saline water of 2000 p.p.m. as raw material was passed at a flow rate of 605 l. per min. per 200 chambers. The solution-path of the diluting chamber was that of FIGURE 6 and that of the concentrating chamber was similar to that of FIGURE 13. Direct electric current of 100 amps. (i.e. an electric current density of 1.00 amp./dm.²) was passed and desalted water of 900 p.p.m. was obtained. This desalted water was passed into the diluting chambers of the stack of the second stage consisting of 170 pairs of membranes and direct electric current of 53 amp. (i.e. an electric current density of 0.53 amp./dm.²) was passed through the electrodialysis area. Desalted water of 405 p.p.m. suitable for drinking was continuously produced at the approximate rate of about 600 l. per min. The electric efficiency was 91%.

*Example 2*

100 pairs of the selectively anion and cation permeable resin membranes having an effective electrodialysis area of 19.6 dm.² (621 mm. by 316 mm.) and 99 frames each having a solution path as in FIG. 20, 3 inlet holes for dilution stream, 4 outlet holes for dilution stream, 4 inlet holes for concentrating solution and 3 outlet holes for concentrating solution are assembled into a electrodialysis unit at membrane distances of 0.75 mm.

The desalting of 35,000 p.p.m. of sea water to 500 p.p.m. using the electrodialysis unit batchwise under following experimental conditions:

| | |
|---|---|
| Linear velocity of solution in diluting chamber | 9.0 cm./sec. |
| Linear velocity of solution in concentrating chamber | 1.3 cm./sec. |
| Concentrating solution | Sea water. |
| Applies electric voltage | 60 volts. |
| Initial volume of sea water for dilution stream in recirculation tank | 850 l. |
| Final volume of product potable water in recirculation tank | 740 l. |

On the other hand, in the case of the experiment under the above-mentioned conditions using the same electrodialysis unit except using frames each having a solution-path as in FIG. 21, the final volume of product potable water of 500 p.p.m. in recirculation tank is only 610 l. from the initial volume 850 l. of 35,000 p.p.m. sea water.

This shows the fact that the solution path as in FIG. 20 has less leakage than that having a curved shape as in FIG. 21.

In apparatus according to the present invention, selectively cation permeable resin membranes include cation exchange resin membranes having the ion exchange group of $-SO_3H$ and/or $-COOH$ and cation permeable amphoteric ion exchange resin membranes having ion exchange group of $-SO_3H$ and/or $-COOH$ and $-NR_3$ (R being H or an alkyl radical), and selectively anion permeable membranes include anion exchange resin membranes having the ion exchange group of $NR_3$ (R being H or an alkyl radical) and anion permeable amphoteric ion exchange resin membranes having the ion exchange group of $NR_3$ (R being H or an alkyl radical) and $-SO_3H$ and/or $-COOH$.

What is claimed is:

1. A multi-cell electrodialysis apparatus comprising a plurality of stacked alternate anion permeable membranes and cation permeable membranes, frames between each two adjacent membranes defining an electrodialysis chamber within the periphery of the frame and between the membranes, the chambers alternately being diluting and concentrating chambers through the stack, the peripheries of the membranes and frames having aligned holes therein forming supply and exhaust conduits for supplying and carrying away diluting and concentrating solutions from the stack, each frame having continuous solution-paths between the holes and chamber defined within the frame and providing communication only between diluting chambers and supply and exhaust conduits for the diluting solution and only between a concentrating chamber and the supply and exhaust conduits for the concentrating solution, a part of the frame between a hole and the electrodialysis chamber being cut away to form at least one of the solution-paths for the diluting solution and concentrating solution, said path having the same width throughout its length, said width being less than 5 mm., and said path having only straight sections, there being at least two of said straight sections, said sections intersecting each other at a sharp angle, and the path having a dimension in the direction of the thickness of the frame, equal to the thickness of the frame.

2. An apparatus as claimed in claim 1 in which the solution-path in adjacent frames are out of alignment.

References Cited

UNITED STATES PATENTS

| | | | |
|---|---|---|---|
| 2,891,899 | 6/1959 | Mason et al. | 204—301 |
| 3,046,211 | 7/1962 | Tye | 204—180 |

HOWARD S. WILLIAMS, *Primary Examiner.*

JOHN H. MACK, *Examiner.*

E. ZAGARELLA, *Assistant Examiner.*